United States Patent
Wass

Patent Number: 5,458,151
Date of Patent: Oct. 17, 1995

[54] CRASH PROOF SOLENOID CONTROLLED VALVE WITH MANUAL OVERRIDE VALVE

[76] Inventor: Lloyd G. Wass, 1670 Blackhawk Cove, Eagan, Minn. 55122

[21] Appl. No.: 266,960

[22] Filed: Jun. 27, 1994

Related U.S. Application Data

[63] Continuation of Ser. No. 39,935, Mar. 29, 1993, Pat. No. 5,341,844, which is a continuation of Ser. No. 880,568, May 8, 1992, Pat. No. 5,193,580, which is a continuation-in-part of Ser. No. 707,584, May 30, 1991, Pat. No. 5,197,710.

[51] Int. Cl.⁶ .............................. F16K 31/06; F16K 11/24
[52] U.S. Cl. .................. 137/613; 251/129.15; 251/144; 222/3; 222/504
[58] Field of Search ............................. 137/613, 210, 137/614.2, 614.21, 535; 251/129.15, 144; 222/3, 504

[56] References Cited

U.S. PATENT DOCUMENTS 4,006,780  2/1977  Zehr.
4,197,966  4/1980  Wadensten et al.

FOREIGN PATENT DOCUMENTS 922433  4/1963  United Kingdom.

Primary Examiner—Martin P. Schwadron
Assistant Examiner—Kevin L. Lee
Attorney, Agent, or Firm—Kinney & Lange

[57] ABSTRACT

A solenoid controlled valve is mounted in a threaded opening of a pressure vessel which contains compressed natural gas. The valve includes a valve body having a head, which is exposed outside of the pressure vessel, and a neck, which is located within the pressure vessel. A solenoid poppet valve is mounted to the inner end of the neck. A valve seat is mounted in a bore within the valve body. An orifice at an inner end of the valve seat exposes a flow passage between the bore of the valve body and an outlet port, which is located in the head of the valve body. The solenoid poppet valve includes a seal for closing the orifice, a bias spring which biases the seal toward the seat to close the orifice, a plunger which is connected to the seal, and a solenoid coil which, when energized, moves the plunger so that the seal moves out of engagement with the seat and permits flow of compressed gas from the interior of the pressure vessel to the outlet port. A section of the flow passage near an outer end of the valve seat includes a threaded surface, into which is threaded a manual override valve. The manual override valve is capable of being selectively positioned to block the flow passage between the solenoid valve and the outlet port.

5 Claims, 8 Drawing Sheets

CRASH PROOF SOLENOID CONTROLLED VALVE WITH MANUAL OVERRIDE VALVE

REFERENCE TO CO-PENDING APPLICATIONS

This is a continuation of application Ser. No. 08/039,935, filed Mar. 29, 1993, now U.S. Pat. No. 5,341,844, which is a continuation of application Ser. No. 07/880,568, filed May 8, 1992, now U.S. Pat. No. 5,193,580, which is a continuation-in-part of application Ser. No. 07/707,584, filed May 30, 1991, now U.S. Pat. No. 5,197,710. Reference is also made to co-pending U.S. patent application Ser. No. 07/707,596, entitled PRESSURE AND TEMPERATURE RELIEF VALVE WITH THERMAL TRIGGER filed May 30, 1991 by Lloyd Wass.

BACKGROUND OF THE INVENTION

The present invention relates to gas valves. In particular, the present invention is a solenoid controlled valve for controlling the flow of a compressed gaseous fuel (such as compressed natural gas) from a pressure vessel that utilizes the pressure vessel as a damage shield or protective "cocoon" for the solenoid valve.

With the increasing concern over air pollution caused by vehicles using internal combustion engines, and with the prospect of increasingly strict emission standards for urban vehicles with internal combustion engines, attention has been directed to use of alternate fuels such as compressed natural gas (CNG) as a fuel for vehicles such as cars, trucks and buses. The compressed natural gas is stored in a pressure vessel, and flow of the gas from the pressure vessel to the engine is controlled by a gas shut off valve.

A gas valve used in a vehicular application can be exposed to a wide variation of operating temperatures. For example, if the compressed natural gas tank is filled in the early morning when the outdoor temperature is relatively low, and the vehicle is parked outside on a blacktop asphalt surface during the heat of the day, the gas pressure within the pressure vessel can rise dramatically (from, for example, a nominal working pressure of about 3,600 psi to close to 5,000 psi). In the winter a vehicle may be fueled in frigid outdoor conditions and moved to a heated indoor garage. The gas valve must be capable of operating reliably over a wide temperature and pressure range.

Another major concern is the vulnerability of the gas valve to crash damage. If the vehicle is involved in an accident, the gas valve must not fail in a unsafe or catastrophic manner. Also the valve should automatically return to a normally closed position upon any indication of a problem such as interruption of electric power or activation of a safety device such as an air bag.

SUMMARY OF THE INVENTION

The gas valve of the present invention is a solenoid-controlled valve which includes a valve body having a neck which extends into the pressure vessel. The valve body also includes a head which is attached to the neck and which is located outside of the pressure vessel. A first bore extends from the inner end of the valve body through the neck to an outlet port in the head.

A valve seat is mounted in the first bore. The valve seat has an orifice at an inner end and a flow passage which extends between the orifice and the outlet port. In one embodiment, the flow passage includes a threaded portion capable of accepting a manually actuated sealing member. A solenoid poppet valve which is mounted to the inner end of the neck controls flow of gas from the pressure vessel through the orifice and the flow passage to the outlet port. The solenoid poppet valve includes a seal for closing the orifice, means for biasing the seal toward the seat to close the orifice, a plunger connected to the seal, and a solenoid coil for moving the plunger so that the seal moves out of engagement with the orifice.

A sealing member having a threaded exterior surface, a sealing surface and a hexagonal opening is provided to manually interrupt the flow of compressed natural gas from the flow passage to the outlet port. Normally in an open position, the sealing member can be manually actuated to position the sealing surface across the flow passage of the valve seat in the unlikely event of a valve failure or a leak of the poppet seal.

In preferred embodiments of the present invention, a "smart" control circuit for the solenoid valve is also mounted within the tank, so that it is not susceptible to crash damage. The control circuit for the solenoid is preferably mounted at the inner end of the solenoid with electrical leads extending out through the bore and a feed through passage to the exterior of the valve and the pressure vessel.

DETAILED DESCRIPTION OF THE PREFERRED EMBODIMENTS

Figure 1:
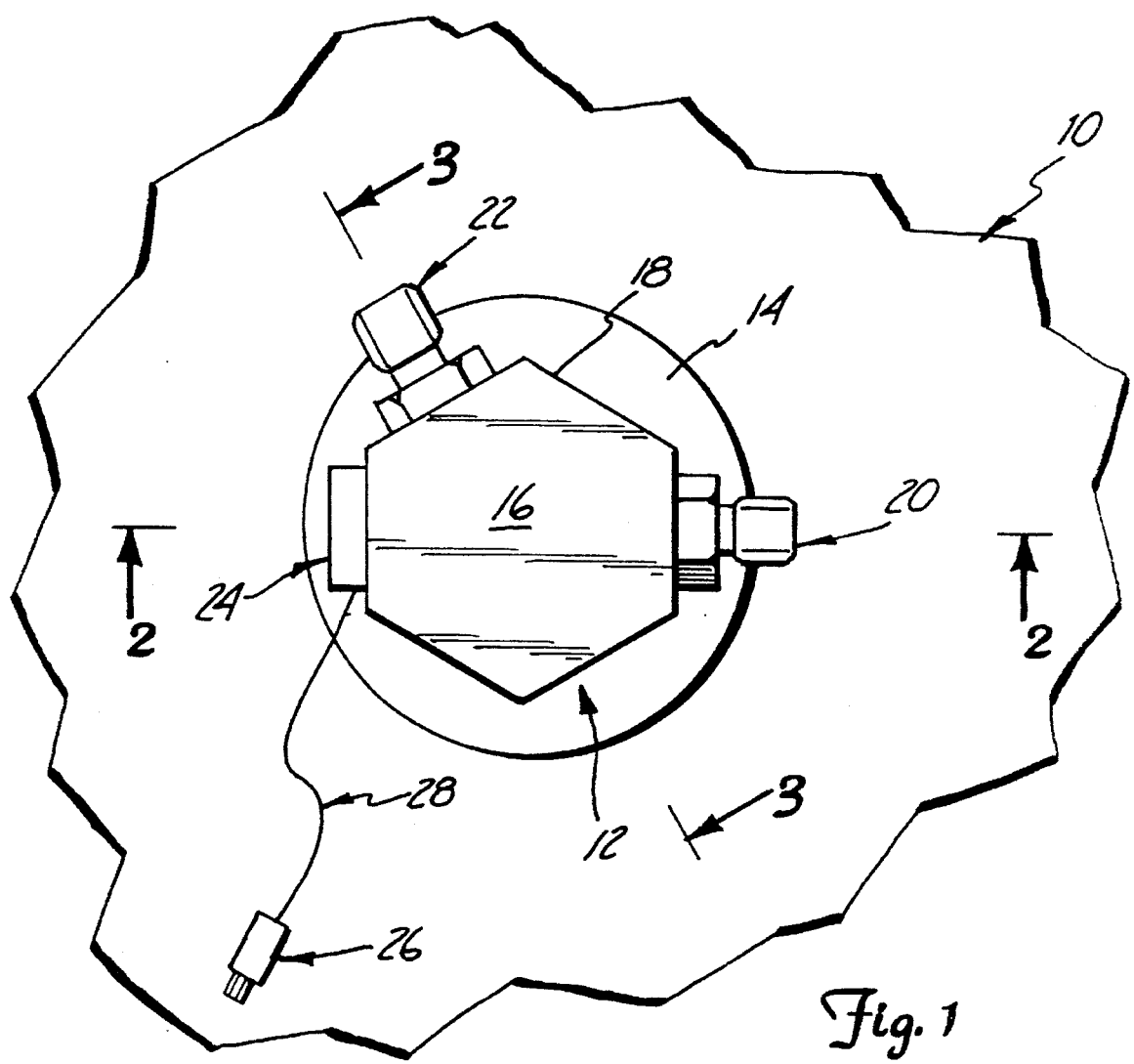
FIG. 1 is a top view of the valve of the present invention mounted in a pressure vessel.

FIG. 1 shows a top view of pressure vessel 10 and solenoid controlled valve 12 of a compressed natural gas system for use in a motor vehicle. Pressure vessel 10 has a collar 14 at which valve 12 is connected.

Valve 12 includes a main valve body 16 with a hexagonal head 18 located outside of collar 14. Attached to separate faces of head 18 are fill fitting 20, outlet fitting 22, and strain relief 24. Pressure vessel 10 is filled with compressed natural gas through fill fitting 20. The flow of compressed natural gas from pressure vessel 10 is through outlet fitting 22. The flow of compressed natural gas from the interior of pressure vessel 10 to outlet fitting 22 is controlled by a solenoid control signal supplied to two-pin connector 26 and multiconductor wire 28.

Figure 2:
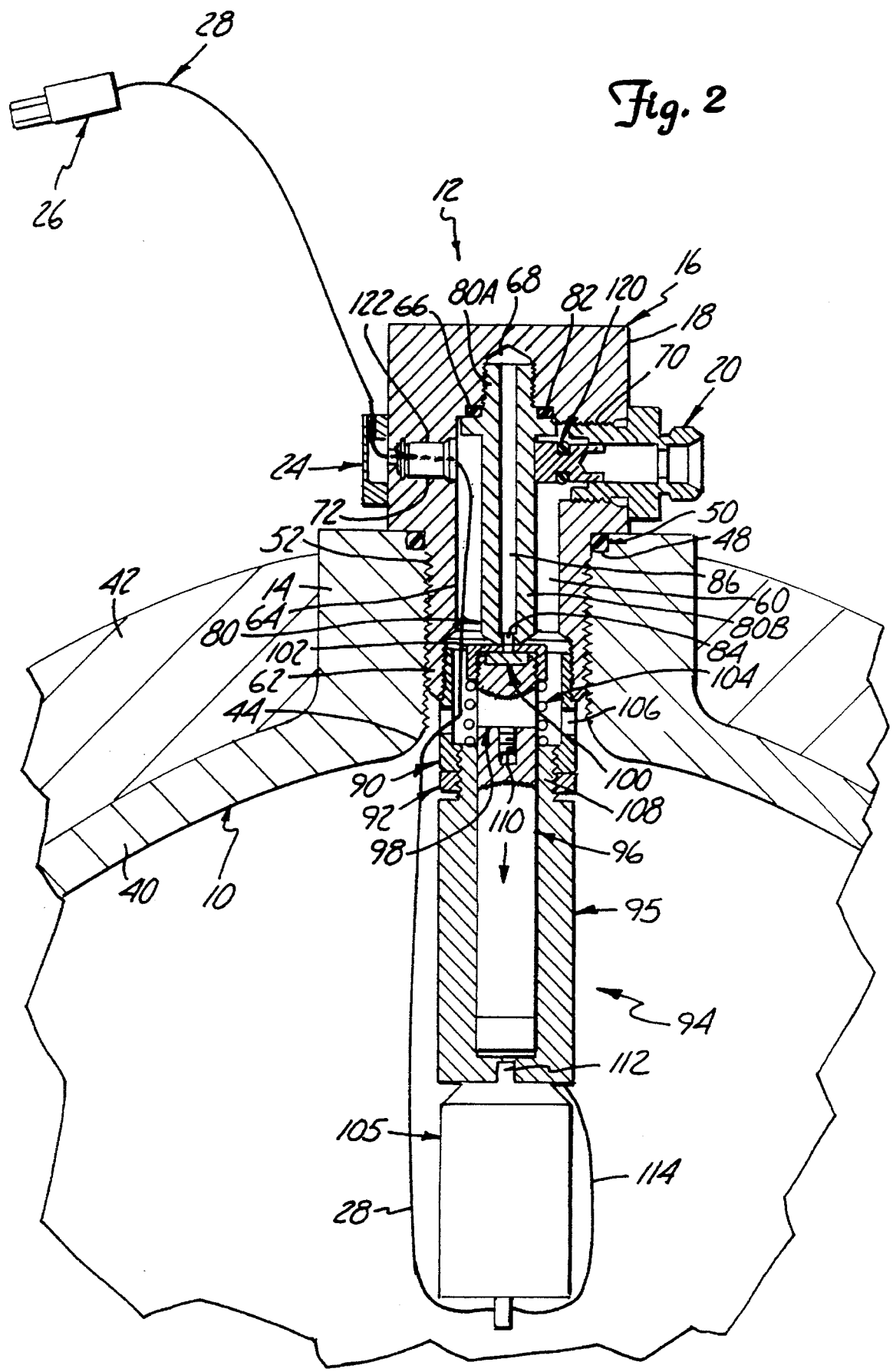
FIG. 2 is a sectional view along section 2—2 of FIG. 1.

The sectional view of FIG. 2 shows pressure vessel 10 and solenoid valve 12 in further detail. In this embodiment, pressure vessel 10 is a composite pressure vessel having a metal inner lining 40 and a fiber glass/polymeric outer cover 42. Collar 14 is metal, and is an integral extension of inner lining 40.

Collar 14 has a central bore 44 with internal threads for engaging valve 12. At the outer end of collar 14 is an annular groove 48 in which O-ring 50 is provided to make a seal between head 18 and collar 14.

Valve body 16 includes neck 52, which extends into bore 44 of collar 14. Neck 52 has external threads which mate with the internal threads of collar 14 to hold valve 12 in place.

Valve body 16 has a main bore 60 which extends from the inner end of neck 52 into head 18. Main bore 60 has an internally threaded lower end portion 62, an unthreaded central portion 64, a shoulder portion 66, and an internally threaded upper end portion 68. Fill port 70, feedthrough port 72, and outlet port 74 (FIG. 3) are connected to main bore 60.

Mounted within bore 60 is seat 80. Upper end 80A of seat 80 has external threads which mate with the internal threads of upper end portion 68 of main bore 60. O-ring 82 provides a seal between seat 80 and valve body 16. At its lower or inner end 80B, seat 80 has an orifice 84. Flow passage 86 extends from orifice 84 to the upper end 80A of seat 80.

Attached to the lower or inner end of neck 52 is a solenoid poppet valve assembly which includes mount 90, jam nut 92, solenoid 94 (which includes coil 95 and plunger 96), poppet 98, seal 100, cap 102, return spring 104, and solenoid control circuit 105.

Mount 90 has a threaded upper end which engages the internal threads of lower end portion 62 of bore 60. Mount 90 includes passages 106 through which gas can flow between main bore 60 and the interior of pressure vessel 10.

The lower end of mount 90 has internal threads which engage external threads on neck 108 of solenoid 94. Jam nut 92 is also attached on threaded neck 108 between mount 90 and solenoid 94.

Poppet 98 has a threaded stud 110 which is threaded into the upper end of plunger 96. At its upper end, poppet 98 has a recess for holding seal 100, and has external threads onto which cap 102 is threaded. Cap 102 holds seal 100 in place, and also provides a bearing surface for the upper end of coil spring 104. The lower end of spring 104 engages the upper end of neck 108 of solenoid 94.

Solenoid control circuit 105 has a threaded stud 112 for attaching control circuit 105 to the lower end of solenoid 94. Multi-conductor wire 114 extends from control circuit 105 to solenoid 94 to provide the drive signal for energizing solenoid coil 95.

In the view shown in FIG. 2, solenoid 94 is in an unenergized condition. In this condition, bias spring 104 has urged poppet 98, plunger 96, seal 100, and cap 102 upward so that seal 100 engages and closes orifice 84. In this position, compressed natural gas within pressure vessel 10 is not permitted to pass through orifice 84 and through flow passage 86 to outlet port 74. Because a gaseous fuel such as CNG is inherently slower refueling than conventional gasoline or diesel fuel, the ideal CNG valve should have a "fast fill" port that is independent of the valve outlet port and is sized significantly larger. This is also desirable from a safety standpoint since this allows the storage cylinder to be refueled with the control valve in the closed position.

Fill fitting 20 is mounted within fill port 70. In the embodiment shown in FIG. 2, fill fitting 70 includes an internal fill check valve 120. In FIG. 2, fill check valve 120 is shown in its inner most position, which it assumes when the pressure at the inlet of fill fitting 20 exceeds the pressure within main bore 60. In that case, fill check valve 120 moves inward until it is stopped by seat 80, and gas is permitted to flow from the inlet of fill fitting 20 into bore 60, and then through openings 106 into the interior of pressure vessel 10. Openings 106 may also contain a porous metal filter to prevent contamination of seal 100.

In normal operation, when fill fitting 20 is not connected to a source of high pressure gas, fill check valve 120 moves outward to block the flow of gas out of fill fitting 20. Fill check valve 120 also acts as a safety device during filling in the event of fill hose rupture.

Multi-connector wire 28 (which is connected to two-pin connector 26) passes through strain relief 24 and through feedthrough port 72 into main bore 60. Feedthrough seal 122 is located within feedthrough port 72 and surrounds wire 28. Feedthrough seal 122, which preferably utilizes components of an engineering plastic such as Delrin or an equivalent, and an elastomer such as SBR or an equivalent, prevents any leakage of gas out of valve 12 through feedthrough port 72.

Wire 28 passes through main bore 60 and through one of the openings 106 in mount 90. The end of wire 28 is connected to control circuit 105, as shown in FIG. 2.

Figure 3:
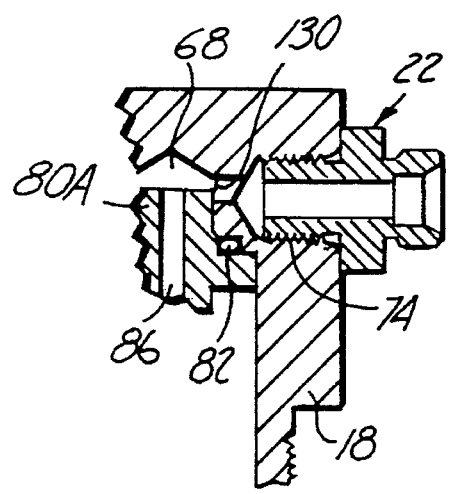
FIG. 3 is a partial sectional view along section 3—3 of FIG. 1.

As shown in FIG. 3, outlet fitting 22 is threaded into outlet bore 74. Passage 130 connects outlet bore 74 with the upper end 68 of main bore 60. When solenoid 94 is de-energized, orifice 84 is closed (as shown in FIG. 2), and no gas can flow through orifice 84 and passage 86 to passage 130 and outlet bore 74. On the other hand, when solenoid 94 is energized, seal 100 is moved out of engagement with orifice 84. That permits natural gas within pressure vessel 10 to flow from main bore 60 through orifice 84 and passage 86 to the upper end 68 of bore 60. The gas can then flow through passage 130 to outlet bore 74, and through outlet fitting 22 to the outlet hose or tubing (not shown) which carries the natural gas to the internal combustion engine (not shown).

Valve 12 is actuated to permit gas flow from pressure vessel 10 to outlet fitting 22 by a low voltage (6–24 volt) DC control signal supplied to two-pin connector 26. When the control signal is supplied through wire 28 to control circuit 105, a drive signal is supplied by control circuit 105 through multiconductor wire 114 to solenoid coil 95. This drive signal causes solenoid coil 95 to pull solenoid plunger 96 into coil 95. In other words, plunger 96 moves downward from its position shown in FIG. 2. When plunger 96 moves downward, it pulls poppet 98 and seal 100 away from orifice 84 of seat 80. This allows gas to flow through orifice 84 and passage 86 to outlet fitting 22.

In a preferred embodiment of the present invention, maximum power is initially supplied to solenoid coil 95 to insure that adequate force is available to pull solenoid plunger 96 into coil 95 and move seal 100 away from orifice 84.

After the solenoid poppet valve has been energized (by the energization of coil 95) and seal 100 has been moved away from seat 80, no pressure drop is present at orifice 84 (as there is when seal 100 is in engagement with seat 80). As a result, less force is required to hold the valve open than is required to open the valve in the first place. Control circuit 105 is a "smart" circuit that supplies a "stepped down" power level to coil 95 on a continuing basis once the valve is opened.

This multi-level energization of solenoid coil 95 is important, because solenoid coil 95 is made as small as possible in order to minimize the size of bore 44 in collar 14. If the maximum power level were supplied on a continuous basis to solenoid coil 95, a dangerous temperature rise could occur in solenoid coil 95 in its insulated environment inside the cylinder. The stepped down power level assures that power can be dissipated by a relatively small solenoid coil, while still obtaining the initial force which is required to open the valve. Because vehicle weight is directly related to fuel economy, the ideal CNG valve must be compatible with light weight, high strength "space age" composite, high pressure gas storage cylinders typically constructed with a relatively thin aluminum liner over wrapped (wound) with a fiberglass/epoxy resin matrix. Vehicular space limitations availability (usually under carriage) on smaller vehicles such as vans and pickup trucks limit pressure vessel diameters to about 9" diameters, which in turn limit the vessel port openings to about 1¼" diameter so as to allow for fiber glass wind angle optimization to reduce/minimize vessel cost and weight. This relatively small cylinder opening coupled with the relatively high operating pressure requirements dictate that a small diameter, high powered solenoid be used. A solenoid of this type would rapidly over heat and burn up when installed in the "insulated" environment inside the pressure vessel unless protected by a "smart" electronic circuit that limits current flow after the valve has been opened.

Figure 4:
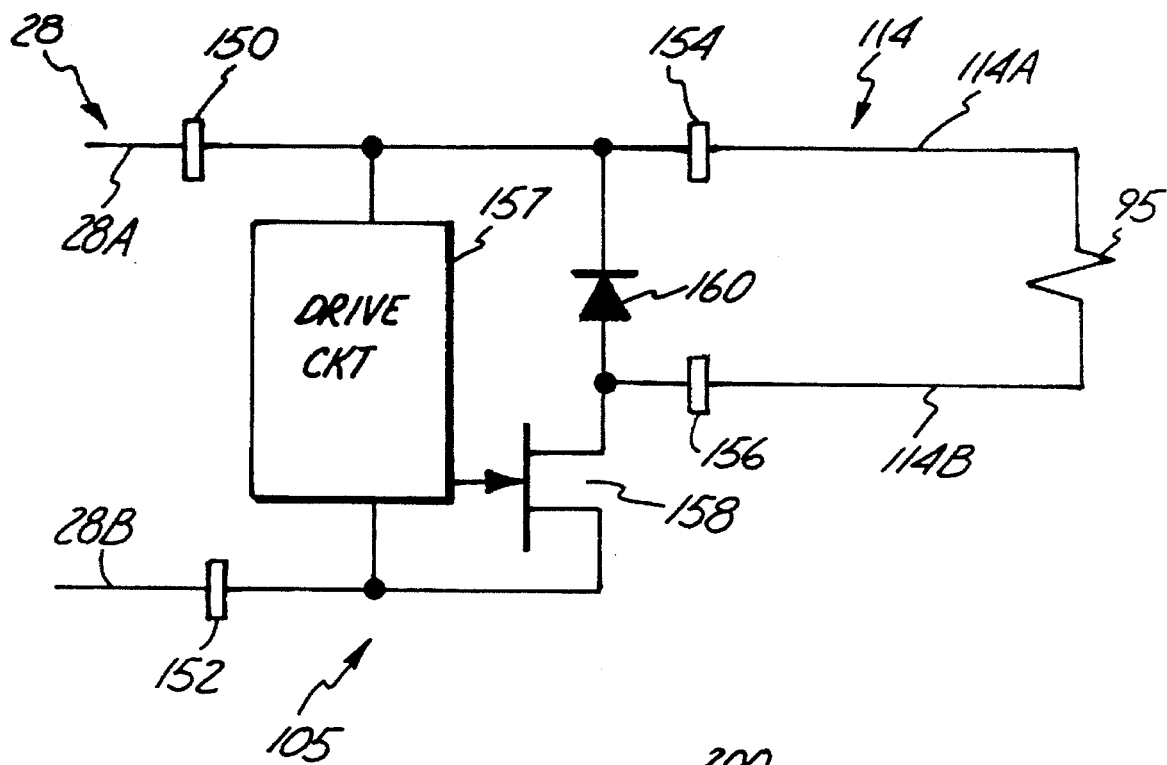
FIG. 4 is an electrical schematic diagram of the control circuit for the solenoid valve of the valve of the present invention.

FIG. 4 shows a diagram of control circuit 105. In this embodiment, circuit 105 includes a pair of input terminals 150 and 152 (which are connected to conductors 28A and 28B of wire 28), a pair of output terminals 154 and 156 (which are connected through conductors 114A and 114B of wire 114 to solenoid coil 95), drive circuit 157, FET switch 158, and diode 160. Control circuit 105 provides the two level energization of coil 95 by controlling the current through FET switch 158. Drive circuit 157 initially powers coil 95 by turning on FET 158 for a period which is long enough to shift plunger 96 and open the valve. Thereafter, drive circuit 157 applies control pulses to FET 158 to apply a pulsed energization to solenoid coil 95. Diode 160 allows current flowing in solenoid coil 95 to continue to flow when FET 158 shuts off. The pulses are at a predetermined pulse width and rate so that a lower power level is supplied to coil 95. The stepped down (pulse width modulated) power level can be adjusted by changing either the pulse width or the rate of the pulses (or both).

In vehicular systems that utilize a short fuel line (small volume) the relatively fast opening of a solenoid control valve can result in a violent shock to the first stage, downstream regulator under conditions encountered with a fully charged cylinder at high temperature.

Figure 5:
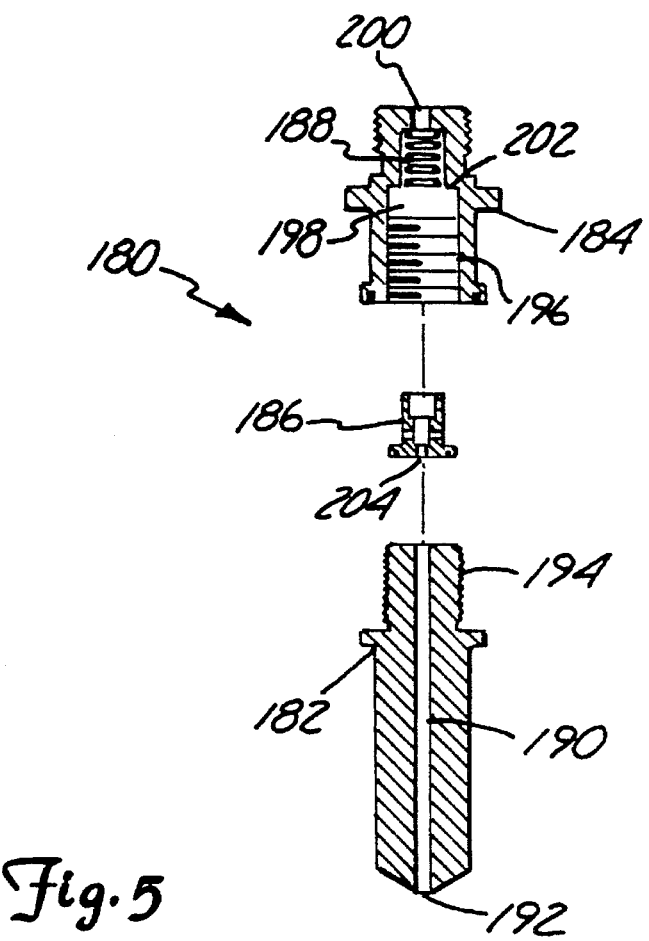
FIG. 5 is an exploded sectional view of another embodiment of the valve seat used in the valve of the present invention.

This shock wave: (which can significantly shorten the life expectancy of the regulator) can be essentially eliminated with the inclusion of an internal surge protection poppet valve, as illustrated in FIG. 5. This surge protection valve will also act as a flow control device in the event of a severed fuel line or catastrophic regulator failure.

Figure 5A:
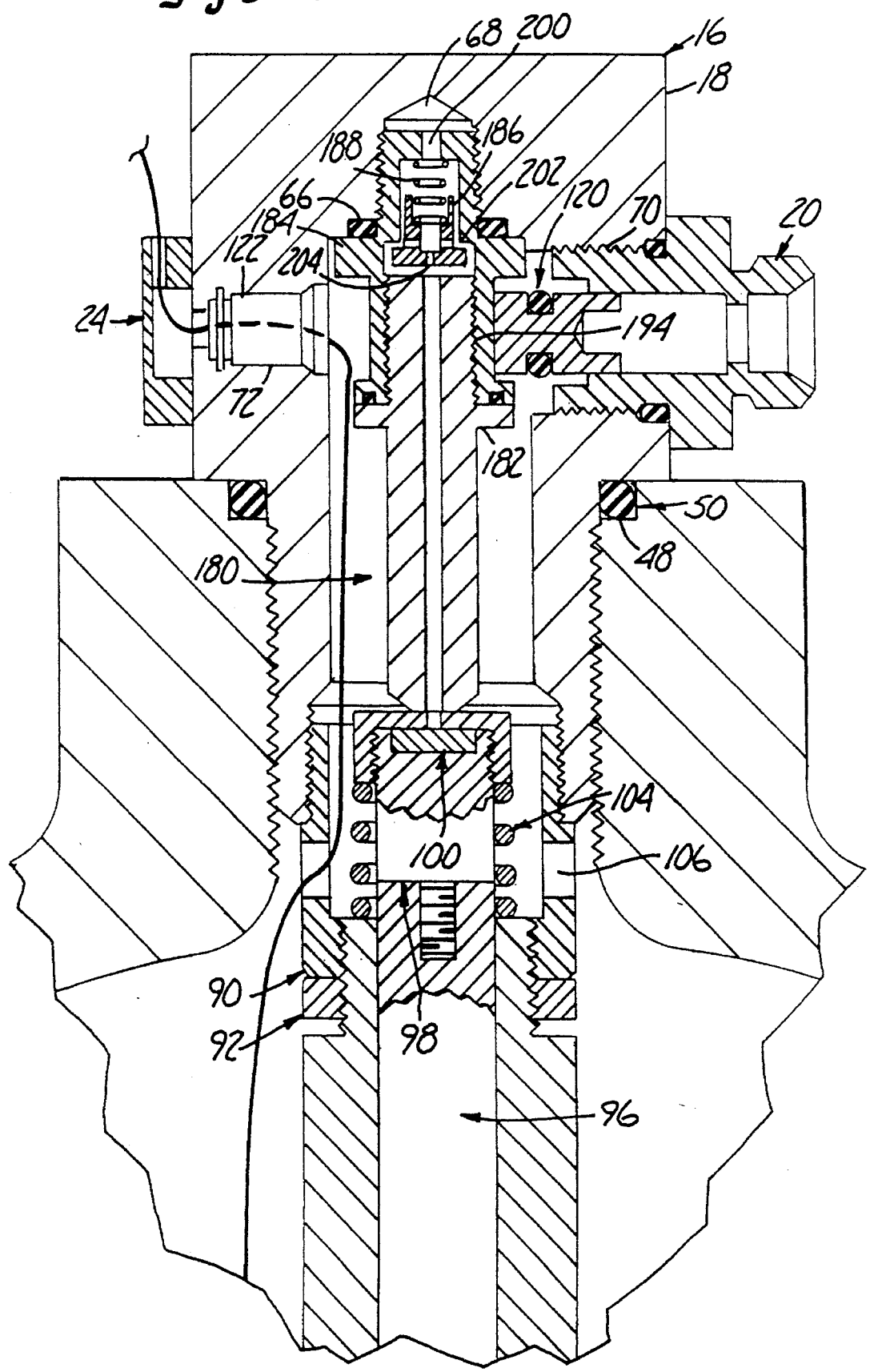
FIGS. 5A and 5B are sectional views of the present invention which incorporate the valve seat of FIG. 5.
Figure 5B:
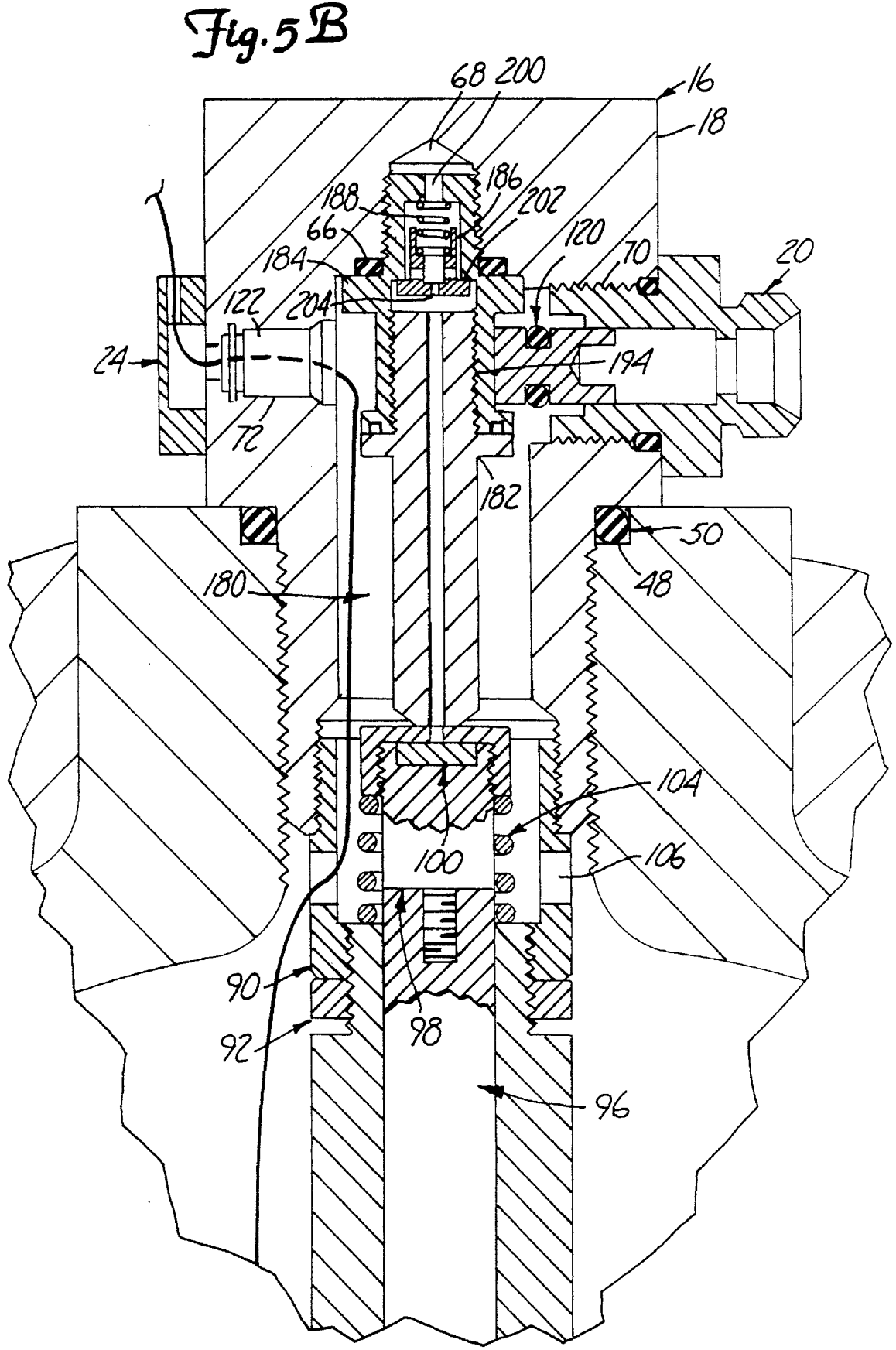

FIGS. 5, 5A and 5B show an alternative embodiment of the valve seat in a sectional, exploded view. Valve seat 180 of FIG. 5 replaces valve seat 80 in valve 12, and provides pressure surge protection and a flow control option. Valve seat. 180 includes seat body 182, poppet housing 184, poppet 186 and spring 188.

Flow passage 190 extends through seat body 182 and forms an orifice 192 at the lower end of seat body 182. The upper end of seat body 182 has external threads 194 which mate with internal threads 196 of poppet housing 184. Poppet 186 is located within cavity 198 of poppet housing 184, and is normally urged by spring 188 toward seat body 182 so that there is substantially unrestricted flow from passage 190 through cavity 198 and out through passage 200 in the upper end of poppet housing 184.

When force on poppet 186 exceeds the bias force of spring 188, poppet seats against shoulder 202. This reduces the instantaneous pressure surge by limiting flow while the poppet valve is closed to flow through passage 204 in poppet 186.

To maximize crash resistance, a "crash proof" CNG solenoid control valve must have a absolute minimum amount of surface exposure outside the tank—preferably no more than is required to accommodate an inlet fitting, an outlet fitting, and an electrical connector.

The present invention provides a solenoid controlled valve for compressed natural gas operated vehicles with a well-protected valve package. The solenoid and the controlled circuitry for the solenoid are "buried", and are preferably located within the interior of the pressure vessel 10. As a result, the possibility of crash damage causing a malfunction of valve 12 is greatly reduced.

The solenoid operated poppet valve action of valve 12 permits a two level energization of solenoid coil 95. A maximum level is required for initially opening the valve, and a lower power level can be used for maintaining the valve in an open condition. As a result, power dissipation in solenoid coil 95 is reduced, which in turn allows the size of solenoid coil 95 to be maximized in relation to the available cylinder opening. That in turn makes it practical to mount solenoid coil 95 (and solenoid control circuit 105) at the inner end of valve body 16, rather than on the exterior of the valve 12.

Figure 6:
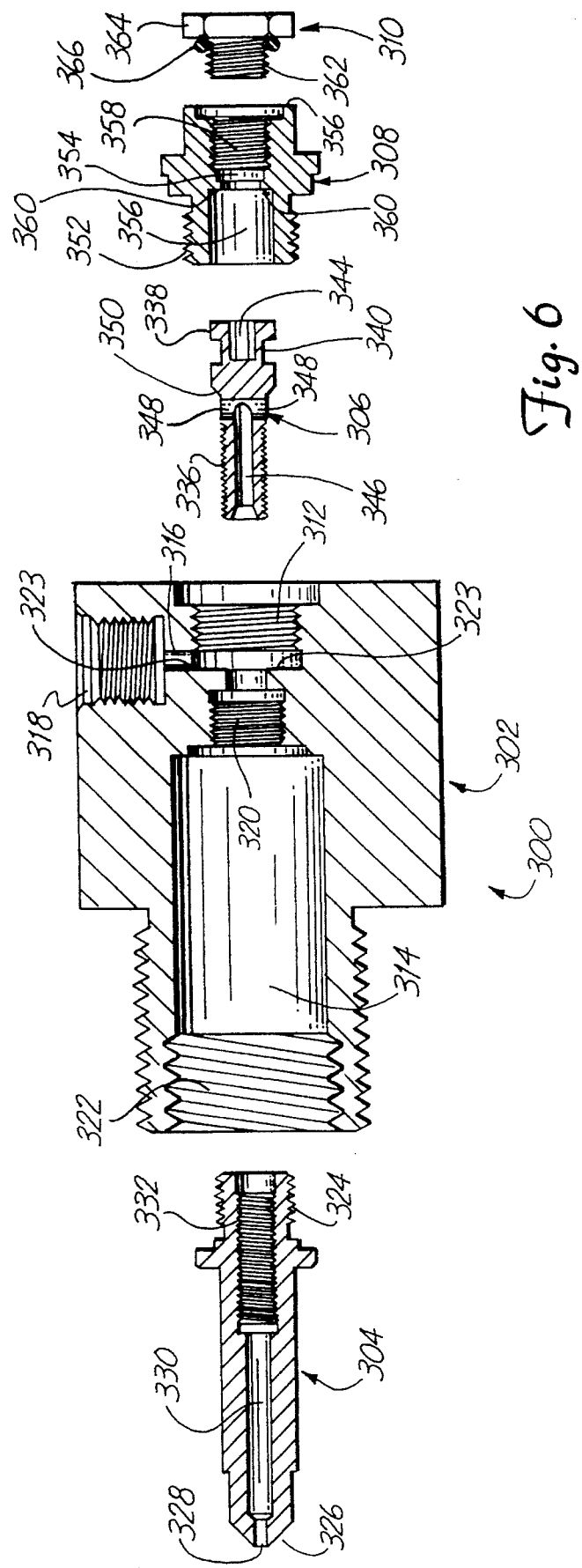
FIG. 6 is an exploded sectional view of a third embodiment of the valve seat used in the valve of the present invention.

FIG. 6 shows a third embodiment of the valve seat used in the valve of the present invention. FIG. 6 shows valve body assembly 300, which includes valve body 302, valve seat 304, override stem 306, override stem retainer 308 and threaded cap 310.

Valve body 302 is configured similar to main valve body 16 shown in FIG. 2, with one exception: valve body 302 includes threaded opening 312, which is configured to accept override stem retainer 308. Threaded opening 312 communicates with main bore 314 and transverse flow passage 316 of valve body 302. Transverse flow passage 316 further communicates with outlet port 318, which has internal threads to accept an outlet fitting similar to outlet fitting 22 shown in FIG. 3. Main bore 314 includes internally threaded upper portion 320 and internally threaded lower end portion 322 similar to the embodiment shown in FIG. 2. Radial shoulder 323 is provided at the intersection of main bore 314 and transverse flow passage 316. Radial shoulder 323 serves as a sealing surface against which a seal may be formed when override stem 306 is properly inserted within internal threaded portion 332 of valve seat 304.

Valve seat 304 is configured similar to seat 80 shown in FIG. 2. Valve seat 304 includes an externally threaded upper end 324, lower end 326, orifice 328, and flow passage 330. Like seat 80 shown in FIG. 2, flow passage 330 extends from orifice 328 to upper end 324; however, unlike flow passage 86 of seat 80, flow passage 330 includes internal threaded portion 332. Internal threaded portion 332 is configured to accept override stem 306.

Override stem 306 is a generally cylindrical-shaped member having externally threaded lower portion 336 and upper portion 338. Upper end portion 338 includes notch 340, which holds O-ring 342 (shown in FIG. 7). Upper end portion 338 also includes hexagonal-shaped opening 344, which is fashioned to accept an Allen wrench for rotating override stem 306 in a clockwise or counter-clockwise direction within valve seat 304. Lower end portion 336 includes opening 346, which extends the length of lower end portion 336 and terminates at upper end portion 338. Opening 346 communicates with flow passage 330 when override stem 306 is inserted within valve seat 304. Side holes 348 are positioned adjacent radially tapered shoulder 350 of upper end portion 338. Side holes 348 communicate between opening 340 and transverse flow passage 316 when override stem 306 is inserted within valve seat 304 in an open condition (shown in FIG. 7). Radially tapered shoulder 350 provides a surface on override stem 306 which is capable of forming a seal against radial shoulder 323 when override stem 306 is in a closed position (shown in FIG. 8).

Figure 7:
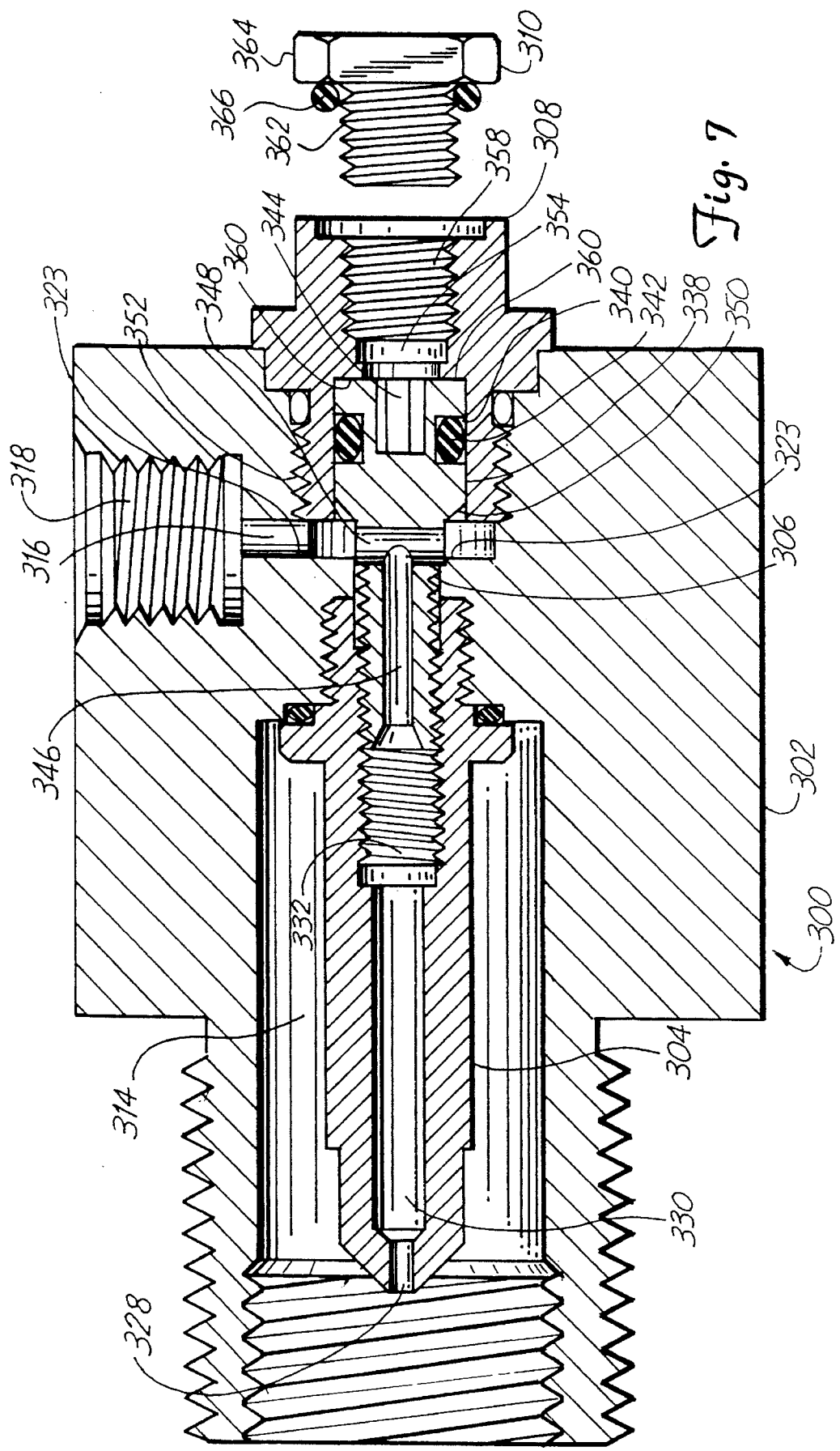
FIG. 7 is a sectional view of the valve of the present invention assembled with the override stem in an open position.
Figure 8:
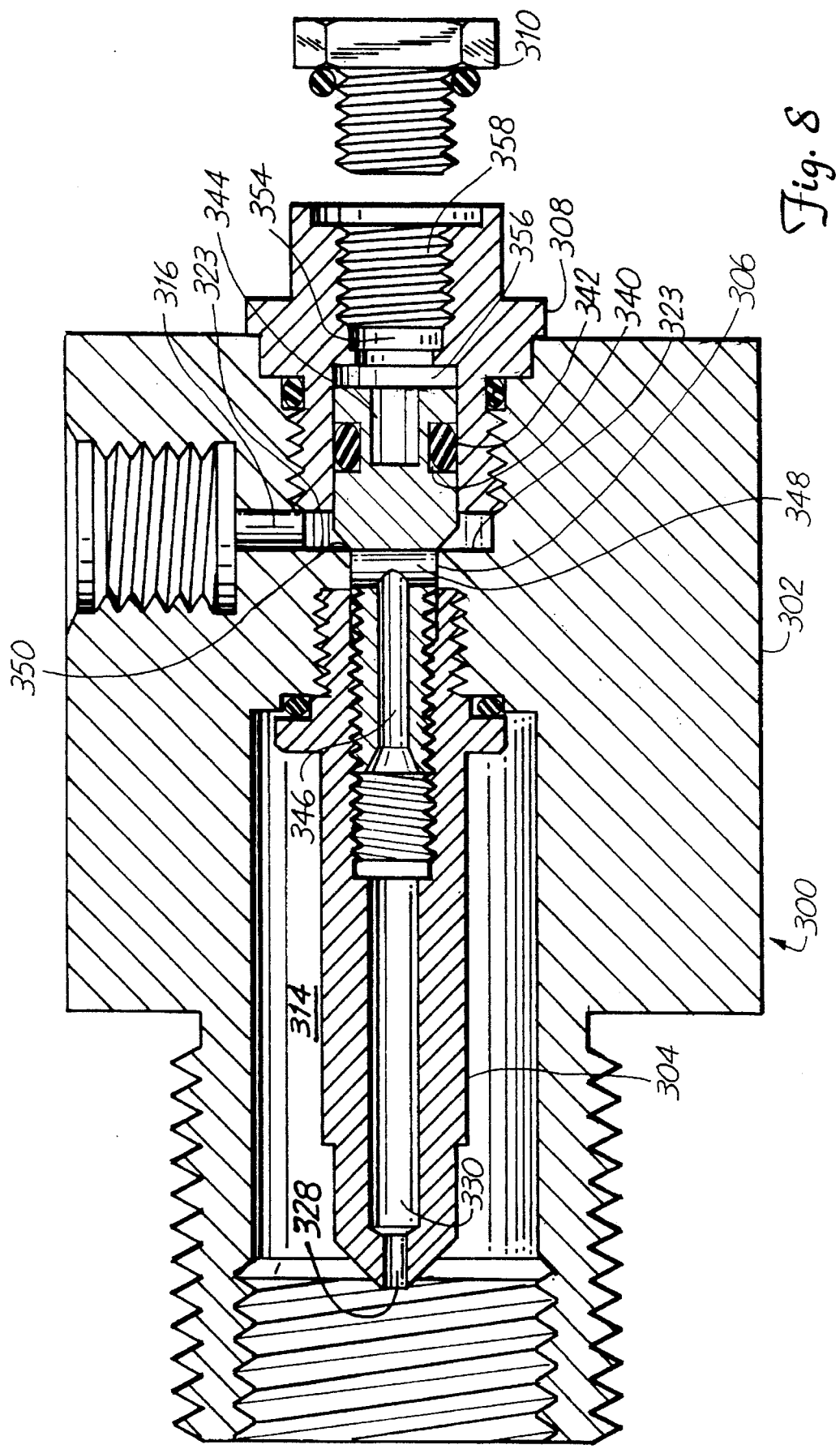
FIG. 8 is a sectional view of the valve shown in FIG. 7 with the override stem in a closed position.

Override stem retainer 308 serve as a cover for override stem 306 and ensures proper alignment of holes 348 with transverse flow passage 316 when override stem 306 is in the open position (as shown in FIG. 7). Override stem retainer 308 includes externally threaded end 352, which permits override stem retainer 308 to be threaded within internally threaded opening 312 of valve body 302. Override stem retainer 308 includes a longitudinal bore 354, which extends from threaded end 352 to hexagonal-shaped cap end 356. Bore 354 includes smooth cylindrical bore 356 and internally threaded portion 358. Smooth cylindrical bore 356 is separated from internally threaded portion 358 by bearing surface 360. Smooth cylindrical bore 356 is sized to allow upper end portion 338 of override stem 306 a free range of longitudinal and axial movement when upper end portion 338 is inserted within override stem retainer 308. As shown in FIGS. 7 and 8, O-ring 342 provides a movable seal of bore 354 regardless of the position of override stem 306 within override stem retainer 308. As shown in FIG. 7, when override stem 306 is in an open position, upper end portion 338 of override stem 306 engages bearing surface 360 to ensure that holes 348 are aligned with transverse flow passage 316.

Cap 310 includes threaded stud 362 and hexagonal-shaped head 364. Threaded stud 362 is sized to be threaded within threaded portion 358 of bore 354. O-ring 366 provides a secondary seal of bore 354 when cap 310 threaded within threaded portion 358 of bore 354 and override stem 306 is in an open position.

FIG. 7 is a sectional view of the third embodiment of the valve seat showing the override stem in an open position. FIG. 7 represents the normal position of override stem 306 during normal operation of the solenoid valve. Externally threaded upper end 324 of valve seat 304 is threaded into internally threaded upper portion of main bore 314, with O-ring 367 providing a seal between valve seat 304 and valve body 302. As shown in FIG. 7, a flow path exists from flow passage 330, through opening 346, out openings 348, and through transverse flow passage 316 to outlet port 318. The addition of override stem 306 to valve body assembly 302 enhances the flexibility and safety of the solenoid valve of the present invention. For instance, in the unlikely event of a failure of the valve (i.e, a leak or seat failure), fluid flow through valve seat 304 to outlet 318 can be halted by removing cap 310, inserting an Allen wrench into hexagonal opening 344 of override stem 306, and rotating override stem 306 in a clockwise fashion to effect a seal between radially tapered surface 350 and radial shoulder 323 (shown in FIG. 8). As override stem 306 is rotated in a clock-wise fashion, holes 348 become disaligned with transverse flow passage 316. O-ring 342 ensures that no fluid passes through bore 354 of override stem retainer 308.

The addition of override stem 306 to valve seat 304 also enhances the flexibility of valve body assembly 300. For instance, where pressure testing of fuel lines downstream from the solenoid valve is necessary, override stem 306 can be advanced to the closed position (shown in FIG. 8) thereby isolating the solenoid valve and compressed natural gas from the lines. Override stem 306 provides a simple, inexpensive, and redundant means for addressing safety concerns of the solenoid control valve of the present invention while improving the versatility of the valve.

Although the present invention has been described with reference to preferred embodiments, workers skilled in the art will recognize that changes may be made in form and detail without departing from the spirit and scope of the invention.

What is claimed is:

1. A valve for controlling a flow of compressed gas from a pressure vessel, the valve comprising:

a valve body having an inner end, an outer end and a bore from the inner end to the outer end, the valve body configured to be threadably connected to the pressure vessel;

a first sealing member within the bore;

a solenoid valve mounted in the bore adjacent to the first sealing member, the solenoid valve having a second sealing member, a plunger connected to the second sealing member, means for positioning the plunger so as to bring the second sealing member in engagement with the first sealing member to close the bore, and a solenoid coil for moving the plunger so as to disengage the second sealing member from the first sealing member to expose the bore for the flow of gas; and a flow regulator within the bore for regulating the flow of gas through the bore.

2. The valve of claim 1 wherein the first sealing member comprises a valve seat having a flow passage which extends between opposing ends of the valve seat, the flow passage being in communication with the bore.

3. The valve of claim 2 wherein the flow regulator comprises a poppet valve positioned in the flow passage of the valve seat.

4. The valve of claim 3 wherein the poppet valve includes a duct in communication with the flow passage, wherein the flow of gas occurs at a first rate through the flow passage when the popper valve is in a first position, and wherein the flow of gas occurs at a second rate, less than the first rate, through the duct of the poppet valve when the poppet valve is in a second position.

5. The valve of claim 4 wherein the flow regulator further comprises means for biasing the poppet valve in the first position.

* * * * *